(12) United States Patent
Kamio et al.

(10) Patent No.: US 8,960,155 B2
(45) Date of Patent: Feb. 24, 2015

(54) OPERATING SYSTEM FOR INTERNAL COMBUSTION ENGINE

(75) Inventors: Junichi Kamio, Saitama (JP); Yasuyuki Kubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 13/363,804

(22) Filed: Feb. 1, 2012

(65) Prior Publication Data

US 2012/0199100 A1 Aug. 9, 2012

(30) Foreign Application Priority Data

Feb. 3, 2011 (JP) .................................. 2011-022017

(51) Int. Cl.
  *F02D 19/08* (2006.01)
(52) U.S. Cl.
  USPC .......................... 123/445; 123/1 A; 123/525
(58) Field of Classification Search
  USPC ....... 123/1 A, 3, 25 R, 27 GE, 299, 304, 445, 123/525–527, 575; 701/103, 104
  See application file for complete search history.

(56) References Cited

U.S. PATENT DOCUMENTS

| 6,622,664 | B2 * | 9/2003 | Holder et al. ..................... 123/3 |
| 8,065,979 | B2 * | 11/2011 | Leone et al. ................... 123/1 A |
| 8,267,074 | B2 * | 9/2012 | Leone et al. ................... 123/575 |
| 2007/0221163 | A1 * | 9/2007 | Kamio ........................ 123/25 B |
| 2008/0228375 | A1 * | 9/2008 | Ashida et al. ................. 701/103 |
| 2008/0257301 | A1 * | 10/2008 | Hotta et al. .................... 123/253 |
| 2008/0288158 | A1 * | 11/2008 | Leone ........................... 701/103 |
| 2010/0224141 | A1 * | 9/2010 | Nakada ............................. 123/3 |

FOREIGN PATENT DOCUMENTS

| JP | 2000-329013 |   | 11/2000 |
| JP | 2007-278298 | A | 10/2007 |
| JP | 2009-293600 |   | 12/2009 |
| JP | 2010-174867 | A | 8/2010 |

OTHER PUBLICATIONS

JP-2010-174867 in English Translation.*
JP-2007-278298 in English Translation.*
Office Action mailed Jul. 1, 2014, issued in corresponding JP Patent Application No. 2011-022017.

* cited by examiner

*Primary Examiner* — John Kwon
*Assistant Examiner* — Johnny H Hoang
(74) *Attorney, Agent, or Firm* — Squire Patton Boggs (US) LLP

(57) ABSTRACT

A fuel separation device is configured to separate the first fuel from the mixed fuel to have a concentration of the high-octane fuel not more than a prescribed upper limit value. The prescribed upper limit is defined that a consumed amount of the high-octane fuel measured under a condition that the internal combustion engine is operated at an operation mode including a state in which a fuel injection amount from a first fuel injection valve for the first fuel is equal to a lower injection amount limit by using the first fuel and the second fuel separated by the fuel separation device is less than a consumed amount of the high-octane fuel measured under at the above operation mode by using the first fuel and the second fuel having the concentration of the high-octane fuel at 100% and 0%, respectively, by a prescribed amount or more.

6 Claims, 11 Drawing Sheets

OPERATING SYSTEM FOR INTERNAL COMBUSTION ENGINE

BACKGROUND OF THE INVENTION

1. Field of the Invention

The present invention relates to an operating system for an internal combustion engine which operates the internal combustion engine by using a high-octane fuel and a low-octane fuel.

2. Related Background Art

Conventionally, as disclosed in, for example, Japanese Patent Laid-open No. 2009-293600 (hereinafter, referred to as Patent Document 1) and Japanese Patent Laid-open No 2000-329013 (hereinafter, referred to as Patent Document 2), there has been known an operating system which is configured to separate a mixed fuel (raw fuel) containing plural fuel components of different octane numbers into a first fuel having a higher concentration of high-octane fuel number components than the raw fuel (first fuel having a higher octane number than the raw fuel) and a second fuel having a lower concentration of high-octane fuel number components than the raw fuel (second fuel having a lower octane number than the raw fuel) by using a separation device, and operate an internal combustion engine by using the first fuel and the second fuel obtained from the separation device.

In such kind of operating system, it is expected to prevent knockings from occurring and to improve the millage by controlling variably according to the operation of the internal combustion engine the ratio of a supplied amount of the high-octane number fuel components (hereinafter, referred to as high-octane fuel) in the fuels supplied to a combustion chamber of the internal combustion engine.

In the internal combustion engine operated by the above-mentioned operating system, the occurrence of knockings can be prevented by increasing the supply ratio of the high-octane fuel to the combustion chamber in a high-load operation; therefore, it is possible to improve output performance (to increase the upper limit of an available output torque) of the internal combustion engine.

However, if the first fuel having a high concentration of the high-octane fuel is frequently consumed, the first fuel will become less and less, and the second fuel having a lower concentration of the high-octane fuel will be excessively remained. In such a situation, since the first fuel is impossible to be consumed any further, more of the second fuel having a low concentration of the high-octane fuel will have to be consumed. Accordingly, it is difficult to prevent the occurrence of knockings in the high-load operation, and consequently, the output performance of the internal combustion engine should be limited.

Therefore, it is desirable the consumed amount of the high-octane fuel by the internal combustion engine which needs the high-octane fuel to be supplied to the combustion chamber thereof in operation should be as less as possible.

On the other hand, in order to improve the output performance of the internal combustion engine while preventing the knockings from occurring, generally, it is advantageous that the octane number to be combusted in the combustion chamber of the internal combustion engine is higher. Thus, as seen in the conventional systems disclosed in Patent Documents 1 and 2, it is common that the separation of the raw fuel is performed to decrease the concentration of the low-octane fuel components contained in the first fuel is as low as possible, in other words, to increase the concentration of the high-octane fuel components contained in the first fuel as high as possible (and consequently, to increase the octane number of the first fuel).

However, as to be described hereinafter, after studied various experiments, the inventors of the present application have discovered that if the concentration of the high-octane fuel contained in the first fuel is high, an excessive amount of the high-octane fuel which is more than the necessary amount appropriate for preventing the occurrence of the knockings would be supplied to the combustion chamber of the internal combustion engine in a normal operation state of the internal combustion engine.

SUMMARY OF THE INVENTION

The present invention has been accomplished in view of the aforementioned background, and it is therefore an object of the present invention to provide an operating system for an internal combustion engine which is configured to operate the internal combustion engine by using a first fuel and a second fuel separated from a mixed fuel and is capable of operating the internal combustion engine while inhibiting the consumption of a high-octane fuel having a higher octane number by setting appropriately the concentration of the high-octane fuel contained in the first fuel.

First, technical matters serving as the presupposition of the present invention will be explained.

After studied various experiments, the inventors of the present application have discovered that there is a relationship between the concentration of the high-octane fuel contained in the first fuel (having a higher concentration of the high-octane fuel than the raw fuel) which is separated from the mixed fuel (the raw fuel) of the high-octane fuel and the low-octane fuel and the consumed amount of the high-octane fuel, and it is desirable to limit the concentration of the high-octane fuel contained in the first fuel from becoming too high other than to increase the concentration thereof to 100% or close to 100% in order to restrain the consumed amount of the high-octane fuel.

Specifically, in general, an appropriate supply ratio of the high-octane fuel (the supply ratio of the high-octane fuel in the fuels to be supplied to the internal combustion engine) for preventing the occurrence of the knockings in the internal combustion engine increases with the increment of the output torque by the internal combustion engine, which is illustrated by the solid line a in the graph of FIG. 1(a). The appropriate supply ratio of the high-octane fuel refers to a supply ratio of a lower limit of the high-octane fuel for preventing the occurrence of the knockings.

The solid line a in the graph of FIG. 1(a) is an example in which the high-octane fuel is for example ethanol and the low-octane fuel is for example gasoline. However, even if the high-octane fuel is of a kind other than ethanol and the low-octane fuel is of a kind other than gasoline, the tendency of the relationship between the supply ratio of the high-octane fuel appropriate for preventing the occurrence of the knockings in the internal combustion engine and the output torque by the internal combustion engine is basically similar to the solid line a in the graph of FIG. 1(a). The same applies to the graph of FIG. 1(b) to be described later.

Meanwhile, due to structural restrictions and the like, it is generally difficult to control a fuel injection amount injected by fuel injection valves which are configured to inject the first fuel and the second fuel respectively to the combustion chamber in the internal combustion engine at a very small amount less than the lower injection amount limit.

Therefore, the actual supply ratio of the high-octane fuel to the internal combustion engine which needs the high-octane fuel to be supplied to the combustion chamber of the internal combustion engine is restricted to maintain the actual fuel injection amount by the first fuel injection valve not less than the lower injection amount limit.

Thereby, in a case where the concentration of the high-octane fuel in the first fuel is for example at 100% or at a high concentration close to 100% (referred to as the first case in the section hereinafter), the total amount of fuel injection amount or almost the total fuel injection amount injected by the first fuel injection valve is constituted by the high-octane fuel. In this case, since it is necessary to maintain the fuel injection amount by the first fuel injection valve not less than the lower injection amount limit, the actual supply ratio of the high-octane fuel needed to be supplied to the combustion chamber of the internal combustion engine is restricted to a supply ratio not less than a value R(great) illustrated by, for example, the dashed line b1 in FIG. 1(a).

When the actual supply ratio of the high-octane fuel is restricted by the value R(great) (in the range A of FIG. 1(a)), the amount of high-octane fuel to be supplied to the combustion chamber of the internal combustion engine will become excessively greater than the appropriate amount defined by the supply ratio illustrated by the solid line a in the graph.

On the other hand, in a case where the concentration of the high-octane fuel in the first fuel is lower than that in the first case, the fuel component other than the high-octane fuel contained in the fuel injected by the first fuel injection valve is greater than that in the first case. Thereby, in a case where the fuel injection of the fuel injection value for the first fuel is conducted at the lower injection amount limit, the amount of the high-octane fuel in the first fuel supplied to the combustion chamber of the internal combustion engine by the first fuel injection valve becomes less than that in the first case.

Thus, in a case where the concentration of the high-octane fuel in the first fuel is low, the actual supply ratio of the high-octane fuel is restricted to a supply ratio not less than a value R(small) (<R(great)) illustrated by, for example, the dashed line b2 in FIG. 1(a). In this case, since the lower limit R(small) of the supply ratio of the high-octane fuel is smaller than the lower limit R(great) of the supply ratio of the high-octane fuel in the first case, the supply ratio of the high-octane fuel in the range A of FIG. 1(a) approaches to the supply ratio illustrated by the solid line a in the graph closer than that in the first case.

Accordingly, the amount of the high-octane fuel to be supplied to the combustion chamber of the internal combustion engine in the range A of FIG. 1(a) decreases more than that in the first case.

Thus, in an operation state of the internal combustion engine where the fuel injection amount from the first fuel injection valve is limited to the prescribed lower injection amount limit, the higher the concentration of the high-octane fuel in the first fuel is, the more high-octane fuel in the first fuel will be excessively consumed. On the opposite, in the same condition, the lower the concentration of the high-octane fuel in the first fuel is, the further the consumed amount of the high-octane fuel in the first fuel will be restrained.

Moreover, in an internal combustion engine mounted in a vehicle or the like, it is common that the operation frequency in a load region from a middle load to a low load (high-frequency operation region in the drawing) is higher than the operation frequency in a high load where the output torque is greater, thereby, the frequency of the operation state where the fuel injection amount of the first fuel injection valve is limited to the prescribed lower injection amount limit as mentioned in the above will be relatively higher as well.

Accordingly, the inventors of the present application have reached the discovery mentioned above that it is desirable to limit the concentration of the high-octane fuel contained in the first fuel from becoming too high rather than to increase the concentration thereof to 100% or close to 100% in order to restrain the consumption amount of the high-octane fuel.

The present invention has been accomplished on the basis of the discovery. The present invention will be described hereinafter. An operating system for an internal combustion engine according to the present invention comprises: a fuel separation device configured to separate a mixed fuel of a high-octane fuel and a low-octane fuel having a lower octane number than the high-octane fuel to a first fuel having a higher concentration of the high-octane fuel than the mixed fuel and a second fuel having a lower concentration of the high-octane fuel than the mixed fuel; an internal combustion engine operating by combusting at least one of the first fuel and the second fuel in a combustion chamber; a first fuel injection valve and a second fuel injection valve configured to be supplied with the first fuel and the second fuel separated by the fuel separation device, respectively, and to inject the first fuel and the second fuel to the combustion chamber of the internal combustion engine for combustion at a fuel injection amount not less than a prescribed lower injection amount limit, respectively; and a fuel supply controller configured to variably set a fuel supply ratio parameter defining a desired value of a supply ratio of the high-octane fuel which is a ratio of a supplied amount of the high-octane fuel in the fuels supplied to the combustion chamber of the internal combustion engine to vary according to at least an output torque from the internal combustion engine and to control the fuel injection quantities from the first fuel injection valve and the second fuel injection valve respectively according to the set fuel supply ratio parameter; wherein the fuel separation device is configured to separate the first fuel from the mixed fuel to have a concentration of the high-octane fuel not more than a prescribed upper limit value, and the prescribed upper limit is defined in such a way that a first high-octane fuel consumption amount is less than a second high-octane fuel consumption amount by a prescribed amount or more, the first high-octane fuel consumption amount is a consumed amount of the high-octane fuel which is detected under such a condition that the internal combustion engine is operated at a preliminarily prescribed operation mode including at least an operation state of the internal combustion engine in which the fuel injection amount from the first fuel injection valve is equal to the lower injection amount limit by using the first fuel and the second fuel separated by the fuel separation device, and the second high-octane fuel consumption is a consumed amount of the high-octane fuel which is detected under such a condition that the internal combustion engine is operated at the prescribed operation mode by using the first fuel having the concentration of the high-octane fuel at 100% and the second fuel having the concentration of the high-octane fuel at 0% (First aspect).

In the present invention, the supply ratio of the high-octane fuel is a volume ratio and the concentration of the high-octane fuel is a volume concentration. Specifically, if the supply ratio of the high-octane fuel is X %, then it means that the volume ratio of the amount of the high-octane fuel with respect to the total amount of fuels supplied to the combustion chamber of the internal combustion engine is X %. In similar, if the concentration of the high-octane fuel in the first fuel is X %, then it means that the volume ratio of the amount of the high-octane fuel with respect to a unit amount of the first fuel is X %.

According to the first aspect of the present invention, the first fuel separated from the mixed fuel (raw fuel) by the fuel separation device has the concentration of the high-octane fuel contained in the first fuel restricted to a concentration not more than the prescribed upper limit, therefore, in addition to the high-octane fuel, the first fuel contains other fuel components (low-octane fuel) as well.

Here, in the operation state of the internal combustion engine where the fuel injection amount from the first fuel injection valve is restricted to the prescribed lower injection amount limit, as mentioned in the above, the higher the concentration of the high-octane fuel in the first fuel is, the more high-octane fuel in the first fuel will be excessively consumed.

In consideration of this fact, in the first aspect of the present invention, the prescribed upper limit is defined in such a way that a consumed amount of the high-octane fuel amount (the first high-octane fuel consumption) which is detected under such a condition that the internal combustion engine is operated in the preliminarily prescribed operation mode by using the first fuel and the second fuel separated by the fuel separation device is less than a consumed amount of the high-octane fuel (the second high-octane fuel consumption amount) which is detected under such a condition that the internal combustion engine is operated at the prescribed operation mode by using the first fuel having the concentration of the high-octane fuel at 100% and the second fuel having the concentration of the high-octane fuel at 0% (experimentally) for a prescribed amount or more.

The prescribed operation mode is configured to include at least an operation state of the internal combustion engine in which the fuel injection amount from the first fuel injection valve is equal to the lower injection amount limit.

As mentioned in the above, according to the first aspect of the present invention, since the concentration of the high-octane fuel in the first fuel is defined to have the upper limit, it is possible to operate the internal combustion engine while restraining the consumed amount of the high-octane fuel.

Generally, the higher the desired value of the concentration of the high-octane fuel in the first fuel separated or generated from the mixed fuel by the fuel separation device is, the more time will be cost for generating the first fuel and the greater size the fuel separation device will be. However, according to the first aspect of the present invention, since the desired value of the concentration of the high-octane fuel in the first fuel separated or generated from the mixed fuel by the fuel separation device is restrained to a relative low concentration not more than the prescribed upper limit, it is possible to shorten the time for the fuel separation device to separate or generate the first fuel and it is possible to miniaturize the size of the fuel separation device as well.

In the first aspect of the present invention, it is acceptable that both of the first fuel injection valve for injecting the first fuel and the second fuel injection valve for injecting the second fuel are configured to be a fuel injection valve of a port injection type which injects fuel into the combustion chamber of the internal combustion engine via an intake port disposed in the combustion chamber, or either one of the first fuel injection valve and the second fuel injection valve is configured to be a fuel injection valve of a direct injection type which injects fuel directly into the combustion chamber of the internal combustion engine.

It is particularly desirable that the first fuel injection valve for injecting the first fuel is a fuel injection valve of a direct injection type which injects the first fuel directly into the combustion chamber of the internal combustion engine and the second fuel injection valve for injecting the second fuel is a fuel injection valve of a port injection type which injects the second fuel into the combustion chamber of the internal combustion engine via an intake port disposed in the combustion chamber (Second aspect).

According to the second aspect of the present invention, when the supply ratio of the high-octane fuel is constant, the lower the concentration of the high-octane fuel in the first fuel is, the more the supply ratio of the first fuel in the fuels supplied to the combustion chamber of the internal combustion engine, namely the ratio of the fuel directly injected from the first fuel injection valve to the combustion chamber (hereinafter, referred to as direct injection ratio where appropriate) in all of the fuels supplied from the first fuel injection valve and the second fuel injection valve to the combustion chamber of the internal combustion engine will be relatively increased (the ratio of the fuel supplied from the second fuel injection valve to the combustion chamber is relatively decreased).

When the supply ratio of the high-octane fuel is constant, it is common that the output torque of the internal combustion engine will be made greater in the case where a direct injection ratio is relatively higher than in the case where the direction injection ratio is lower.

Therefore, as illustrated by, for example, the graph of the solid lines c1, c2 and c3 in FIG. 1(b), the appropriate supply ratio of the high-octane fuel for preventing the occurrence of the knockings in the internal combustion engine decreases as the concentration of the high-octane fuel in the first fuel drops.

In addition, the graph of the solid lines c1, c2 and c3 in FIG. 1(b) denotes a state where the supply ratio of the high-octane fuel under a condition that the high-octane fuel should be supplied to the combustion chamber of the internal combustion engine is restricted not less than the lower limit (equivalent to R(great) and R(small) in FIG. 1(a)) corresponding to the lower injection amount limit of the first fuel injection valve.

Thus, according to the second aspect of the present invention, it is possible to further reduce the consumed amount of the high-octane fuel. When the supply ratio of the high-octane fuel is constant, by restricting the concentration of the high-octane fuel in the first fuel to a concentration not more than the prescribed upper limit, the first fuel injected from the first fuel injection valve which is a fuel injection valve of a direct injection type, is more than in the case where the concentration is higher than the prescribed upper limit, it is possible to improve the cooling effect of the first fuel injection valve. Thereby, it is possible to prevent the first fuel injection valve from becoming excessively high temperature due to the combustion heat. In the first aspect or the second aspect of the present invention, the prescribed upper limit value is defined in such a way, for example, that the first high-octane fuel consumption amount is not more than a value which is 90% of the second high-octane fuel consumption amount (Third aspect). According thereto, with respect to the consumed amount of the high-octane fuel (the second high-octane fuel consumption amount) which is detected under such a condition that the internal combustion engine is operated at the prescribed operation mode by using the first fuel having the concentration of the high-octane fuel at 100% and the second fuel having the concentration of the high-octane fuel at 0%, the consumed amount of the high-octane fuel (the first high-octane fuel consumption amount) which is detected under such a condition that the internal combustion engine is operated at the preliminarily prescribed operation mode by using the first fuel and the second fuel separated by the fuel separation device can be reduced by 10% or more. In the third aspect of the present invention, the prescribed upper limit value may be defined, for example, at 75% (Fourth aspect). According to the fourth aspect of the present invention, it is possible to make the fuel separation device into an appropriate size to be mounted in a vehicle such as an automobile easily.

In either one from the first aspect to the fourth aspect of the present invention, the lower limit value of concentration of the high-octane fuel in the first fuel separated or generated from the mixed fuel by the fuel separation device may be defined as a value which is smaller than the prescribed upper limit value by a given amount. However, the lower limit value is desired to be preliminarily defined according to the following principle.

Namely, it is desirable that the fuel separation device is configured to separate the first fuel from the mixed fuel to have a concentration of the high-octane fuel not more than the prescribed upper limit value and not less than a prescribed lower limit value, and the prescribed lower limit value is set in such a way that the maximum value of the output torque of the internal combustion engine obtained when the internal combustion engine is operated by using only the first fuel having the concentration of the high-octane fuel matched with the prescribed lower limit value as the fuel to be supplied to the combustion chamber of the internal combustion engine is not less than a preliminarily prescribed torque value (Fifth aspect).

Basically, the higher the supply ratio of the high-octane fuel is, the greater the maximum torque which can be output by the internal combustion engine without producing the knockings will be increased. For example, as illustrated by the graph in FIG. 2, the maximum torque which can be output by the internal combustion engine increases as the increment of the supply ratio of the high-octane fuel. The torque ratio (%) represented by the vertical axis in FIG. 2 denotes a decreasing degree of a torque decreased from the maximum torque of the internal combustion engine when the supply ratio of the high-octane fuel is 100%.

FIG. 2 is an example graph in which the high-octane fuel is ethanol and the low-octane fuel is gasoline. However, even though the high-octane fuel and the low-octane fuel are other than ethanol and gasoline, respectively, the basic trend of the relationship between the supply ratio of the high-octane fuel and the maximum torque which can be output by the internal combustion engine remains similar to the graph in FIG. 2.

Meanwhile, the upper limit of the supply ratio of the high-octane fuel is restricted in relation to the concentration of the high-octane fuel in the first fuel. Specifically, when the supply ratio of the high-octane fuel is denoted by X % and the concentration of the high-octane fuel in the first fuel is denoted by Y %, the supply ratio of the high-octane fuel X % can not exceed the concentration of the high-octane fuel in the first fuel Y %; thus, Y % is the upper limit of X %. The upper limit of the supply ratio of the high-octane fuel may be accomplished by supplying only the first fuel from the first fuel injection valve to the combustion chamber of the internal combustion engine.

Thus, in the fifth aspect of the present invention, the prescribed lower limit value is set in such a way that the maximum value of the output torque of the internal combustion engine obtained when the internal combustion engine is operated by using only the first fuel (the internal combustion engine is operated by the fuel supplied from the first fuel injection valve only) having the concentration of the high-octane fuel matched with the prescribed lower limit value as the fuel to be supplied to the combustion chamber of the internal combustion engine is not less than a preliminarily prescribed torque value.

According thereto, it is possible to attain the operating system for the internal combustion engine capable of producing the desired maximum torque from the internal combustion engine while reducing the consumed amount of the high-octane fuel.

In the fifth aspect of the present invention, it is preferable that the prescribed torque value is, for example, a torque value having a magnitude of 95% of the maximum value of the output torque of the internal combustion engine obtained when the internal combustion engine is operated by using only the first fuel having the concentration of the high-octane fuel at 100% (Sixth aspect).

According to the sixth aspect of the present invention, even in a case where the concentration of the high-octane fuel in the first fuel matches with the prescribed lower limit value, it is possible to obtain the maximum value of the output torque of the internal combustion engine to be a high torque having a sufficiently small difference to the maximum output torque value of the produced by the internal combustion engine when the internal combustion engine is operated by using only the first fuel having the concentration of the high-octane fuel at 100% (The first fuel contains only the high-octane fuel).

As viewed from the graph in FIG. 2, when the supply ratio of the high-octane fuel is increased to a certain extent, the maximum value of the output torque from the internal combustion engine becomes saturated and the increasing degree of the maximum value of the output torque with respect to the increment of the supply ratio of the high-octane fuel becomes smaller.

Therefore, the supply ratio of the high-octane fuel corresponding to the torque value having a magnitude of 95% of the maximum value of the output torque (hereinafter, referred to the maximum reference torque) produced by the internal combustion engine when the internal combustion engine is operated by using only the first fuel having the concentration of the high-octane fuel at 100%, in other words, the internal combustion engine is operated by using the supply ratio of the high-octane fuel at 100%, will be a relatively small ratio.

More specifically, as viewed from the graph in FIG. 2, when the maximum value of the output torque from the internal combustion engine is equal to the torque value having a magnitude of 95% of the maximum reference torque, the supply ratio of the high-octane fuel is about 30%.

Thus, according to the sixth aspect of the present invention, it is possible to reduce the concentration of the high-octane fuel in the first fuel as low as possible while maintaining the maximum value of the available output torque from the internal combustion engine in a high torque range, and consequently, to further reduce the consumed amount of the high-octane fuel.

DETAILED DESCRIPTION OF THE PREFERRED EMBODIMENTS

An embodiment according to the present invention will be described hereinafter.

Figure 3:
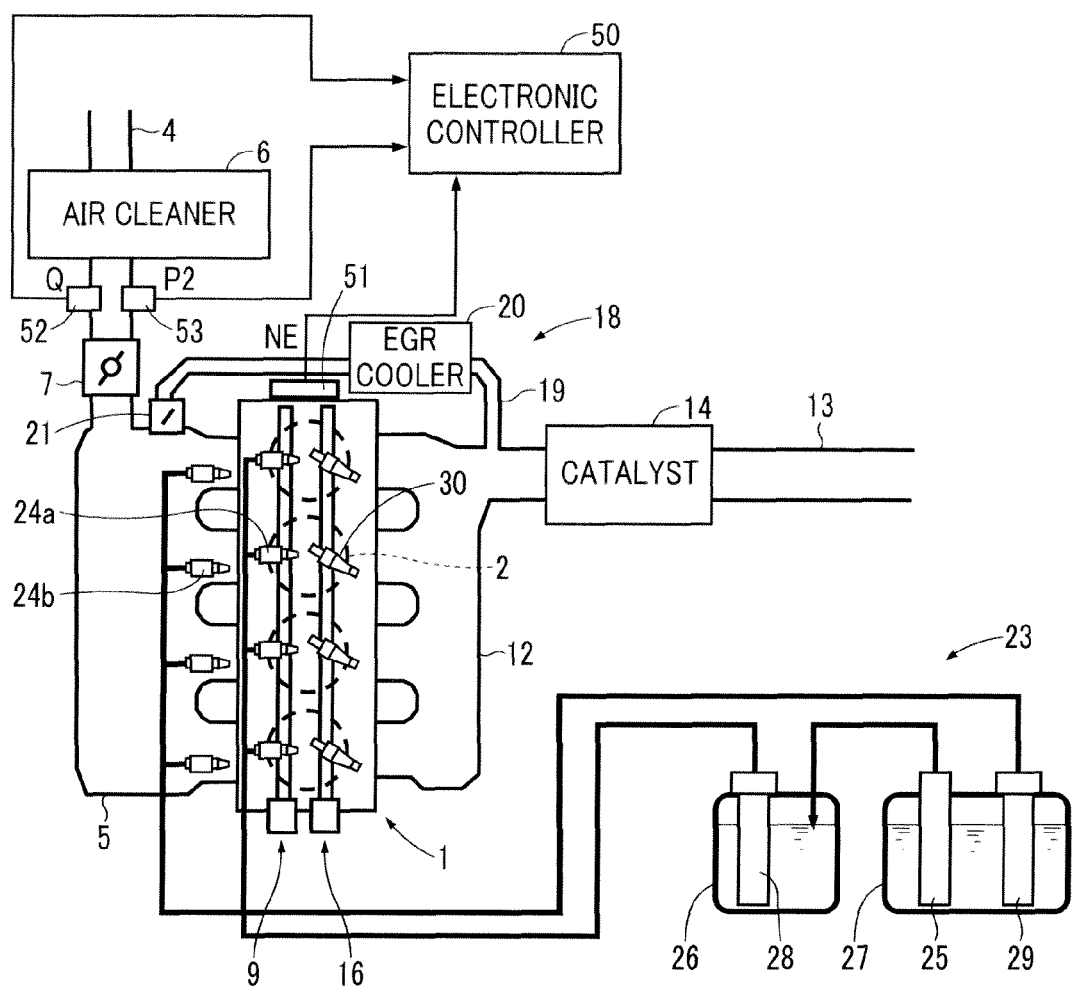
FIG. 3 is a diagram illustrating the configuration of an operating system for an internal combustion engine according to an embodiment of the present invention.
Figure 4:
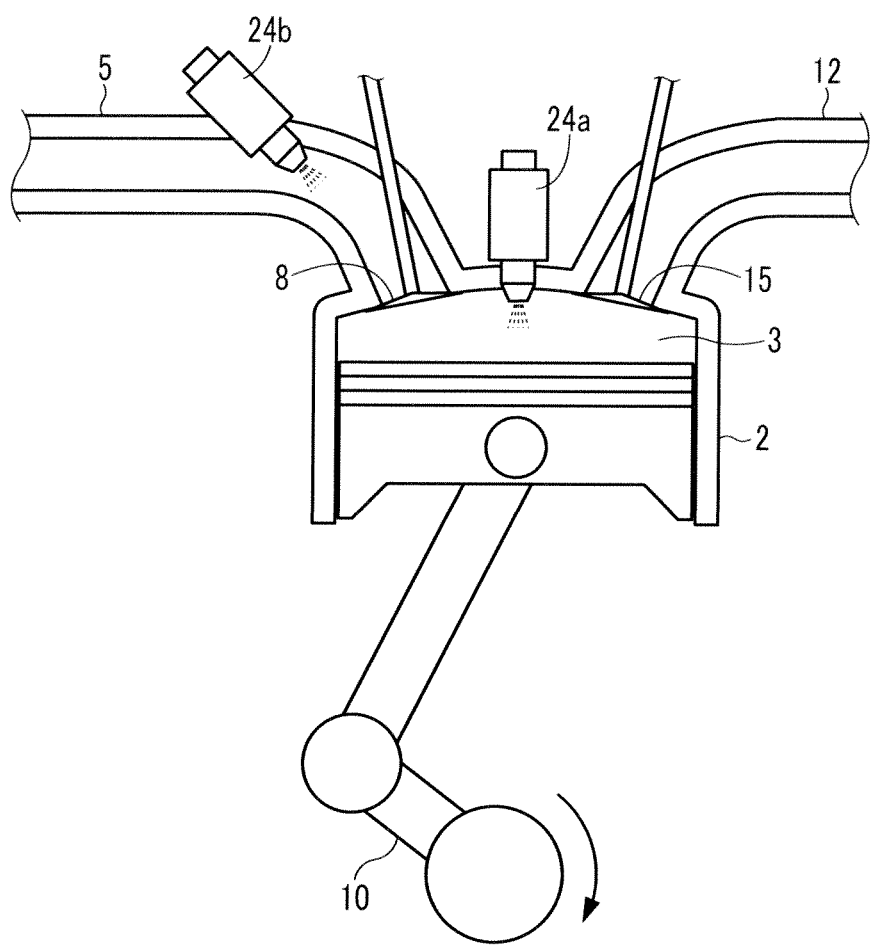
FIG. 4 is a diagram illustrating the configuration of each cylinder in the internal combustion engine illustrated in FIG. 3.

With reference to FIG. 3 and FIG. 4, an operating system for an internal combustion engine of the present embodiment is provided with an internal combustion engine 1 mounted in a vehicle as a driving power source, and an electronic controller 50 for controlling the operation of the internal combustion engine 1.

The internal combustion engine 1 in the present embodiment is an internal combustion engine having, for example, 4 cylinders. However, the number of cylinders is not limited to four. For example, the internal combustion engine 1 may be a singular cylinder internal combustion engine or 6-cylinder internal combustion engine.

An intake system of the internal combustion engine 1 is configured to supply air (fresh air) mixed with fuels for combustion in a combustion chamber 3 disposed in each cylinder 2 to the combustion chamber 3 disposed in each cylinder 2 via an intake passage 4 common for all the cylinders 2 and an intake manifold 5 communicated to an intake port for the combustion chamber 3 in each cylinder 2.

An air cleaner 6 configured to remove undesired substances in the air (atmospheric air) flowing into the intake passage 4 from the outer side and a throttle valve 7 configured to regulate the flow rate of the air are sequentially installed in the intake passage 4 from the upstream side thereof. The throttle valve 7 is an electric throttle valve and an opening degree thereof is controlled via an electric motor (not shown).

The internal combustion engine 1 is installed with an inlet valve 8 (illustrated in FIG. 4) configured to open or close the intake port for the combustion chamber 3 in each cylinder 2 and an inlet valve driving mechanism 9 (illustrated in FIG. 3) configured to drive the inlet valve 8 to open or close. The inlet valve driving mechanism 9, although not illustrated in detail in the drawing, is configured to drive the inlet valve 8 to open or close by an intake cam rotating in conjunction with a crank shaft 10 which is the output shaft of the internal combustion engine 1 via a rocker arm.

An exhaust system of the internal combustion engine 1 is configured to exhaust gas generated in the combustion chamber 3 disposed in each cylinder 2 via an exhaust manifold 12 communicated to an exhaust port for the combustion chamber 3 in each cylinder 2 and an exhaust passage 13 common for all the cylinders 2. In the present embodiment, a catalyst 14 for purifying the exhaust gas is installed in the exhaust passage 13.

Further, the internal combustion engine 1 is installed with an exhaust valve 15 (illustrated in FIG. 4) configured to open or close the exhaust port for the combustion chamber 3 in each cylinder 2 and an exhaust valve driving mechanism 16 (illustrated in FIG. 3) configured to drive the exhaust valve 15 to open or close. The exhaust valve driving mechanism 16, although not illustrated in detail in the drawing, is configured to drive the exhaust valve 15 to open or close by an exhaust cam rotating in conjunction with the crank shaft 10 which is the output shaft of the internal combustion engine 1 via a rocker arm.

The intake system and the exhaust system of the internal combustion engine 1 configured in the above are further installed with an EGR device 18.

The EGR device 18 is configured to reflux a part of the exhaust gas back to the intake air side and supply the refluxed exhaust gas together with air (fresh air to be mixed with the fuels) to the combustion chamber 3 in each cylinder 2. The EGR device 18 includes an EGR passage 19 (passage for the refluxed exhaust gas) which is branched from the upstream end portion of the exhaust passage 13 (which is close to the joint position of the exhaust passage 13 to the exhaust manifold 12) and joins with the intake manifold 5.

The EGR passage 19 is installed with an EGR cooler 20 serving as an exhaust gas cooling unit configured to cool the exhaust gas refluxed back to the intake air side and an electric or electromagnetic flow rate controlling valve configured to control the flow rate of the exhaust gas (hereinafter, referred to as EGR valve 21). Thus, it is possible to control the EGR rate (the ratio of the amount of the exhaust gas with respect to the total amount of the air supplied to the combustion chamber 3 and the exhaust gas) by controlling the opening degree of the EGR valve 21.

Furthermore, the internal combustion engine 1 is disposed with fuel injection valves 24a and 24b for each cylinder 2 as constituent elements of a fuel supply device 23 configured to supply fuels for combustion in the combustion chamber 3 of each cylinder 2.

The internal combustion engine 1 according to the present embodiment is configured to supply separately a first fuel and a second fuel having different octane numbers (average octane number) from the fuel injection valves 24a and 24b, respectively, to the combustion chamber 3 in each cylinder 2. Both or either one of the first fuel and the second fuel are combusted in the combustion chamber 3 disposed in each cylinder 2 so as to operate the internal combustion engine 1.

The fuel supply device 23 in the present embodiment separates or generates the first fuel and the second fuel by using a fuel separation device 25 from a mixed fuel (raw fuel) mixed with a high-octane fuel and a low-octane fuel. The mixed fuel (raw fuel) in the present embodiment is mixed from ethanol serving as the high-octane fuel and gasoline serving as the low-octane fuel having a lower octane number than the high-octane fuel.

More specifically, the mixed fuel in the present embodiment is such a mixed fuel, for example, called as E10, that the concentration (volume concentration) of ethanol (high-octane fuel) in the mixed fuel is smaller than the concentration of gasoline (low-octane fuel) in the mixed fuel. The mixed fuel E10 contains ethanol at a concentration of 10% (volume ratio).

The first fuel separated or generated from the mixed fuel (raw fuel) has a higher concentration of the high-octane fuel (ethanol) than the mixed fuel, and the second fuel has a lower concentration of the high-octane (ethanol) than the mixed fuel. In the present embodiment, the concentration of the high-octane fuel in the second fuel is set to be sufficiently smaller than the concentration of the high-octane fuel in the first fuel.

The configuration of the fuel supply device 23 having the fuel separation device 25 will be described in detail here. The fuel supply device 23 is disposed with a first fuel tank 26 for storing the first fuel and a second fuel tank 27 for storing the second tank, and the fuel separation device 25 is mounted on the second fuel tank 27. The fuel separation device 25 is supplied with the mixed fuel (raw fuel) stored in a fuel tank (not shown) for storing the mixed fuel (raw fuel).

Although not illustrated in detail in the drawings, the fuel separation device 25 is a membrane separation device having a separation membrane for separating, for example, the mixed fuel, and is configured to separate or generate the first fuel having the concentration of the high-octane fuel substantially matched with a prescribed value (desired value) from the supplied mixed fuel. The fuel separation device 25 may have a publically known structure. For example, the one disclosed in Japanese Patent Laid-open No. 2007-278298 may be adopted as the fuel separation device 25.

The fuel separation device 25 transfers the first fuel separated or generated from the mixed fuel to the first fuel tank 26. Furthermore, the fuel separation device 25 stores the first fuel in the first fuel tank 26, and stores the remained fuel after the first fuel has been excluded from the mixed fuel in the second fuel tank 27 as the second fuel.

In the present embodiment, the desired value for the concentration of the high-octane fuel (ethanol) in the first fuel separated or generated from the mixed fuel is set in a range between a prescribed upper limit value (<100%) and a prescribed lower limit value (>0%). The upper limit value and the lower limit value for the concentration (in volume ratio) are, for example, 75% and 30%, respectively. Thus, the desired value for the concentration of the high-octane fuel in the first fuel generated by the fuel separation device 25 takes a value (for example, 50% or the like) in the range from 30% to 75%. The size of the separation membrane, the separation speed and the like in the fuel separation device 25 are designed so as to generate the first fuel having an actual concentration of the high-octane fuel roughly matched with the desired value and constrained in the range from 30% to 75%.

The reasons for setting the upper limit value and lower limit value for the concentration of the high-octane fuel contained in the first fuel will be described later.

The fuel supply device 23 is configured to pressurize the first fuel in the first fuel tank 26 via a pressurization mechanism 28 constituted from a pump and the like and supply the pressurized first fuel to the fuel injection valve 24a in the fuel injection valves 24a and 24b. Furthermore, the fuel supply device 23 is configured to pressurize the second fuel in the second fuel tank 27 via a pressurization mechanism 29 constituted from a pump and the like and supply the pressurized second fuel to the fuel injection valve 24b in the fuel injection valves 24a and 24b.

In the present embodiment, the fuel injection valve 24a for the first fuel in the fuel injection valves 24a and 24b is a direct type injection valve for injecting the first fuel directly to the combustion chamber 3 in each cylinder 2. The fuel injection valve 24a, is disposed at the top of the combustion chamber 3 in each cylinder 2 as illustrated in FIG. 4.

The fuel injection valve 24b for the second fuel is a port type fuel injection valve for supplying the second fuel to the combustion chamber 3 in each cylinder 2 via the intake port, and is disposed in the intake manifold 5 as illustrated in FIG. 4. The fuel injection amount (the fuel amount supplied to the combustion chamber 3) from each of the fuel injection valves 24a and 24b is controlled through controlling the time for opening each valve.

As mentioned in the above, by disposing the fuel injection valve 24a for injecting the first fuel and the fuel injection valve 24b for injecting the second fuel separately, it is possible to control separately the amount of the first fuel and the amount of the second fuel supplied to the combustion chamber 3 in each cylinder 2. In this case, the concentration of the high-octane fuel in the first fuel generated by the fuel separation device 25 is roughly constant and the concentration of the high-octane fuel in the second fuel is sufficiently smaller than the concentration of the high-octane fuel in the first fuel.

Therefore, the supply ratio of the high-octane fuel in the total fuel supplied to the combustion chamber 3 in each cylinder 2 per combustion cycle is substantially defined by the ratio (volume ratio) of the amount of the first fuel with respect to the amount of the total fuel (total amount of the first fuel and the second fuel) and the concentration of the high-octane fuel in the first fuel.

Accordingly, it is possible to control the supply ratio of the high-octane fuel in the total fuel (the volume ratio of the amount of the high-octane fuel in the total fuel) supplied to the combustion chamber 3 in each cylinder 2 by controlling the fuel injection amount by each of the fuel injection valves 24a and 24b.

The internal combustion engine 1 is disposed with an ignition plug 30 in each cylinder 2 as a constituent element of an ignition device configured to ignite the compressed mixture gas in the combustion chamber 3 of each cylinder 2.

The ignition plug 30 is installed at the top of the combustion chamber 3 in each cylinder 2 and is configured to generate sparks when a high voltage is supplied from a distributer (not shown) at prescribed timing.

Hereto, the mechanical configuration of the system (the internal combustion engine 1 and the operating system thereof) according to the present embodiment has been described in the above.

Figure 5:
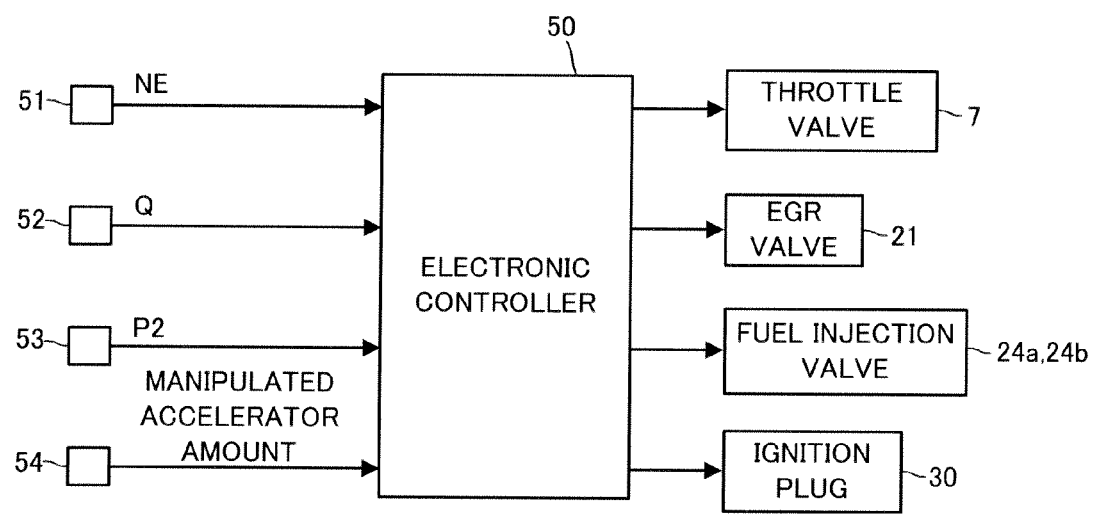
FIG. 5 is a block diagram illustrating the configuration related to the controlling of the operating system of FIG. 3.

The electronic controller 50 is an electronic circuit unit comprised of a CPU, a RAM, a ROM and the like, and is configured to control the operations of the throttle valve 7, the EGR valve 21 in the EGR device 18, the fuel injection valves 24a and 24b in the fuel supply device 23, and the ignition plug 30, as illustrated by the block diagram of FIG. 5.

Detection signals from various sensors are input to the electronic controller 50 responsible for such control functions. In the operating system of the present embodiment, the sensors to be described below are provided and the detection signals from the sensors are input into the electronic controller 50.

Specifically, in the operating system of the present embodiment, the internal combustion engine 1 is disposed with a revolution sensor 51 configured to output a signal for detecting the number of revolutions NE (revolution speed) of the crank shaft 10 of the internal combustion engine 1 (specifically, a pulse signal generated every time when the crank shaft 10 rotates for a defined angle).

As illustrated in FIG. 3, an air flow rate sensor 52 for detecting a flow rate Q of the air flowing through the intake passage 4 and a pressure sensor 53 for detecting a pressure P2 of the air flowing into the throttle valve 7 are disposed in the intake passage 4.

Further, an accelerator sensor 54 for detecting the manipulated amount of an accelerator pedal (hereinafter, referred to as the manipulated accelerator variable) in the vehicle (not shown) is disposed in the operating system of the present embodiment.

Hereinafter, the operations of the operating system of the present embodiment will be described. In order to control the operations of the internal combustion engine 1, the electronic controller 50 performs a control process to control the air amount to be supplied to the combustion chamber 3 in each cylinder 2 via the throttle valve 7 and the like, a control process to control the fuels to be supplied to the combustion chamber 3 in each cylinder 2 via the fuel injection valves 24a and 24b, and a control process to control the ignition timing via the ignition plug 30. These control processes are achieved by a program installed in the electronic controller 50.

Figure 6:
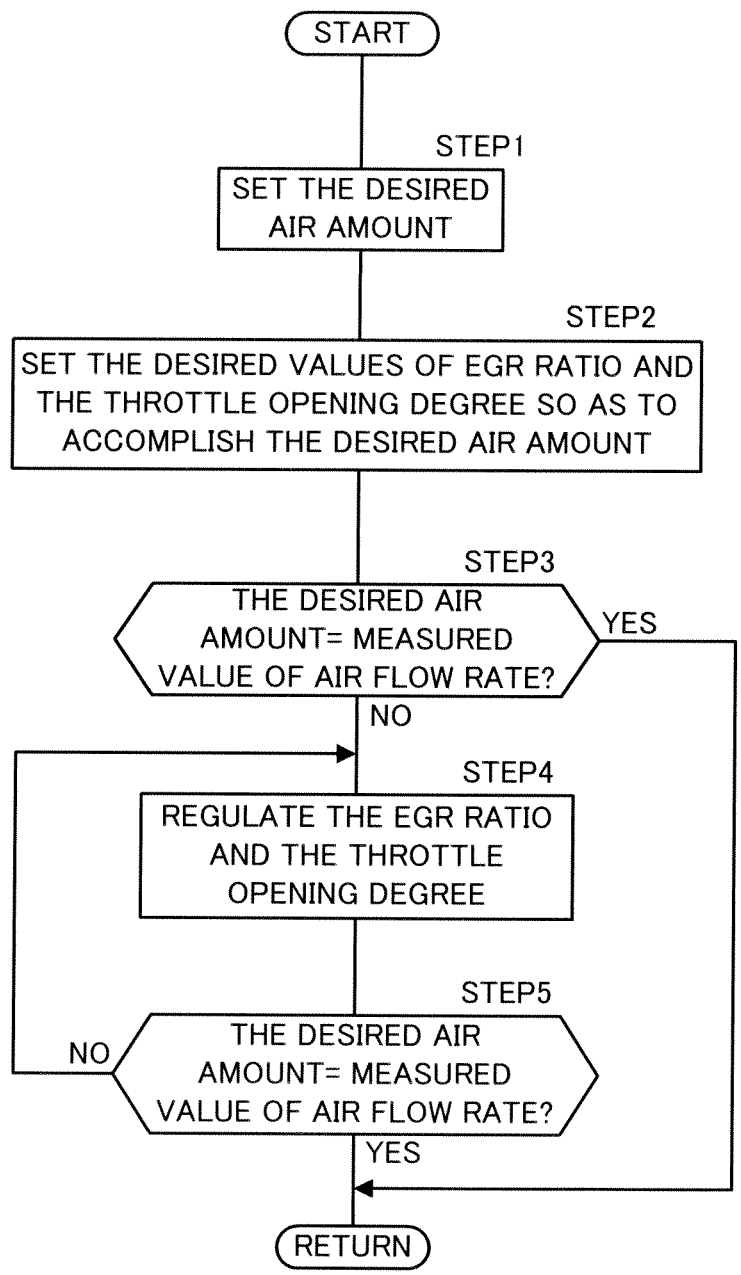
FIG. 6 is a flow chart illustrating a process performed by an electronic controller illustrated in FIG. 3 and FIG. 5.

The control process related to the air amount to be supplied to the combustion chamber 3 in each cylinder 2 is performed according to, for example, the flow chart illustrated in FIG. 6.

In the control process, the electronic controller 50 firstly determines a desired air amount, namely the desired value of the air flow rate Q of the intake passage 4 in STEP 1.

Figure 7:
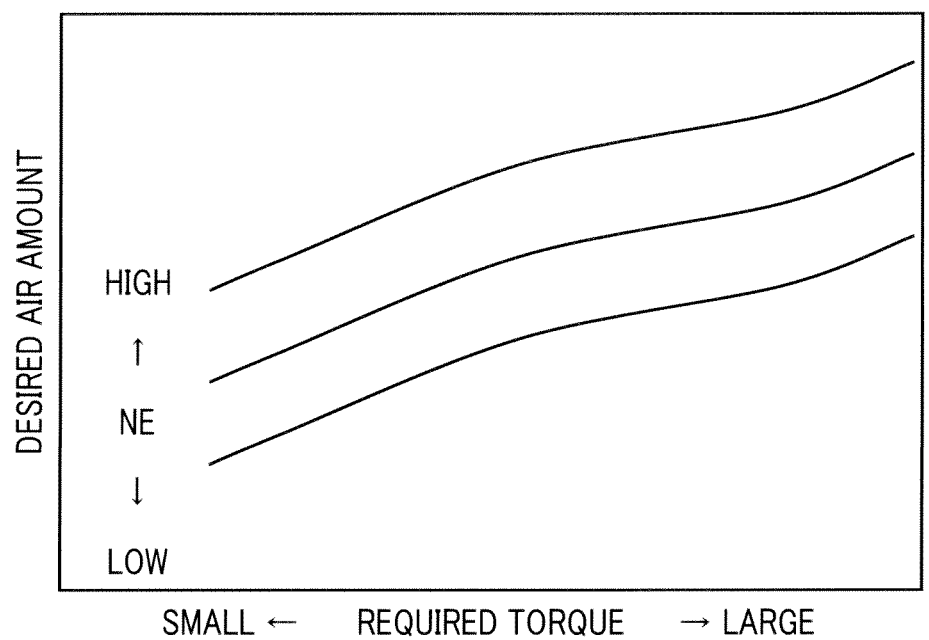
FIG. 7 is a diagram illustrating a map used in the process of STEP 1 in FIG. 6.

Specifically, the electronic controller 50 determines the desired air amount necessary for producing a required torque on the basis of a predefined map illustrated in FIG. 7 (a map defining the relationship among the required torque and the number of revolutions NE and the desired air amount) from the required torque (desired value of the output torque) of the internal combustion engine 1 and a measured value of the number of revolutions NE recognized from the output of the revolution sensor 51.

The basic trend of the map in FIG. 7 is configured in such a way that the desired air amount increases as the required torque increases, or the desired air amount increases as the number of revolutions increases. The required torque is determined on the basis of a map (not shown) from a measured value of the manipulated accelerator variable recognized from the output of the accelerator sensor 54 or a measured value of the manipulated accelerator variable and a measured vehicular velocity. In general, the required torque is determined greater as the manipulated accelerator variable becomes greater.

Subsequently, the process moves to STEP 2 where the electronic controller 50 sets a desired value of the EGR rate for producing the desired air amount and a desired value of the throttle opening degree.

Figure 8:
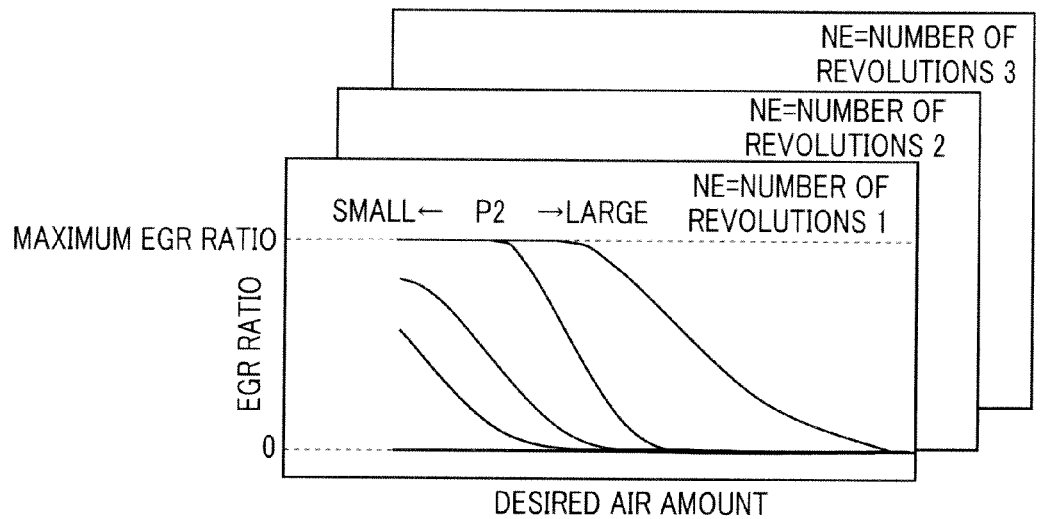
FIG. 8 is a diagram illustrating a map used in the process of STEP 2 in FIG. 6.

Specifically, the electronic controller 50 sets the desired value of the EGR rate on the basis of a predefined map illustrated in FIG. 8 (a map defining the relationship among the desired air amount, the pressure P2, the number of revolutions NE and the desired value of the EGR rate) from the desired air amount determined in STEP 1, a measured value of the pressure P2 (the pressure of the air flowing into the throttle valve 7) recognized from the output of the pressure sensor 53, and a measured value of the number of revolutions NE of the internal combustion engine 1. The basic trend of the map in FIG. 8 is configured in such a way that the desired value of the EGR rate decreases as the desired air amount increases, or the desired value of the EGR rate increases as the pressure P2 increases, or the desired value of the EGR rate increases as the number of revolutions NE increases.

Figure 9:
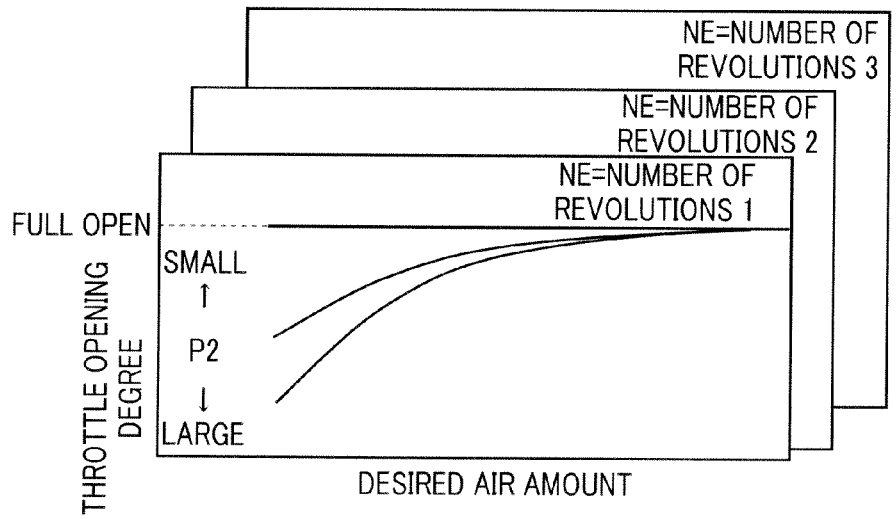
FIG. 9 is a diagram illustrating a map used in the process of STEP 2 in FIG. 6.

The electronic controller 50 sets the desired value of the throttle opening degree on the basis of a predefined map illustrated in FIG. 9 (a map defining the relationship among the desired air amount, the pressure P2, the number of revolutions NE and the desired value of the throttle opening degree) from the desired air amount, a measured value of the pressure P2 and a measured value of the number of revolutions NE. The basic trend of the map in FIG. 9 is configured in such a way that the desired value of the throttle opening degree increases as the desired air amount increases, or the desired value of the throttle opening degree decreases as the pressure P2 increases, or the desired value of the throttle opening degree remains roughly constant with respect to the number of revolutions NE.

The desired air amount is set to increase as the required torque of the internal combustion engine 1 increases, consequently, the desired value of the EGR rate determined by using the map in FIG. 8 is determined in such a characteristic that the desired value of the EGR rate decreases as the required torque increases.

And consequently, the desired value of the throttle opening degree determined by using the map in FIG. 9 is determined in such a characteristic that the desired value of the throttle opening degree increases as the required torque increases.

Thereafter, the process moves to STEP 3 where the electronic controller 50 determines whether or not the measured value of the air flow rate Q recognized according to the output from the air flow rate sensor 52 is in accordance with the desired air amount determined in STEP 1. It should be noted that when saying the measured value of the air flow rate Q is in accordance with the desired air amount, it does not mean that the measured value of the air flow rate Q is strictly equivalent to the desired air amount, it means that the absolute value of the difference therebetween is constrained to a prescribed value or below.

If the determination result in STEP 3 is affirmative, the electronic controller 50 terminates the current process in the flow chart of FIG. 6 and stands idle till next arithmetic processing cycle. Meanwhile, the opening degree of the EGR valve 21 and the throttle opening degree are maintained in the current state.

On the other hand, if the determination result in STEP 3 is negative, the electronic controller 50 performs the process in STEP 4. In STEP 4, the electronic controller 50 adjusts the actual effective compression ratio, the actual EGR rate and the actual throttle opening degree in the current state so as to approach the actual air flow rate Q (measured value) to the desired air amount.

In STEP 5 subsequent to STEP 4, the electronic controller 50 performs the same determination process as that in STEP 3, and repeats the process in STEP 4 until the determination result in STEP 5 becomes affirmative.

The repeated process in STEP 4 will be described in detail hereinafter. Specifically, after STEP 3, in the initial round of the process in STEP 4, the actual opening degree of the EGR valve 21 and the actual throttle opening degree are set at a reference opening degree of the EGR valve 21 determined according to the desired value of the EGR rate set in STEP 2 and the desired value of the throttle opening degree set in STEP 2, respectively. Here, the reference opening degree of the EGR valve 21 is an opening degree to obtain from the desired value of the EGR rate set in STEP 2. The reference opening degree is determined according to a predefined map or the like according to the desired value of the EGR rate. If the air flow rate Q is determined to be smaller than the desired air amount by the determination process in STEP 5, the actual opening degree of the EGR valve 21 is decreased from the current opening degree for a predetermined amount (and consequently, the EGR rate is decreased), and the actual throttle opening degree is increased from the current opening degree for a predetermined amount in the process of STEP 4.

If the air flow rate Q is determined to be greater than the desired air amount by the determination process in STEP 5, the actual opening degree of the EGR valve 21 is increased from the current opening degree for a predetermined amount (and consequently, the EGR rate is increased), and the actual throttle opening degree is decreased from the current opening degree for a predetermined amount in the process of STEP 4.

By repeating the process of STEP 4, the actual opening degree of the EGR valve 21 and the actual throttle opening degree are adjusted close to the reference opening degree corresponding to the desired value of the EGR rate and the desired value of the throttle opening degree, respectively. Accordingly, the actual opening degree of the EGR valve 21 and the actual throttle opening degree are controlled respectively so as to make the actual air flow rate Q (measured value) match with the desired air amount.

Hereto, the process of the flow chart in FIG. 4 has been described in detail in the above.

Figure 10:
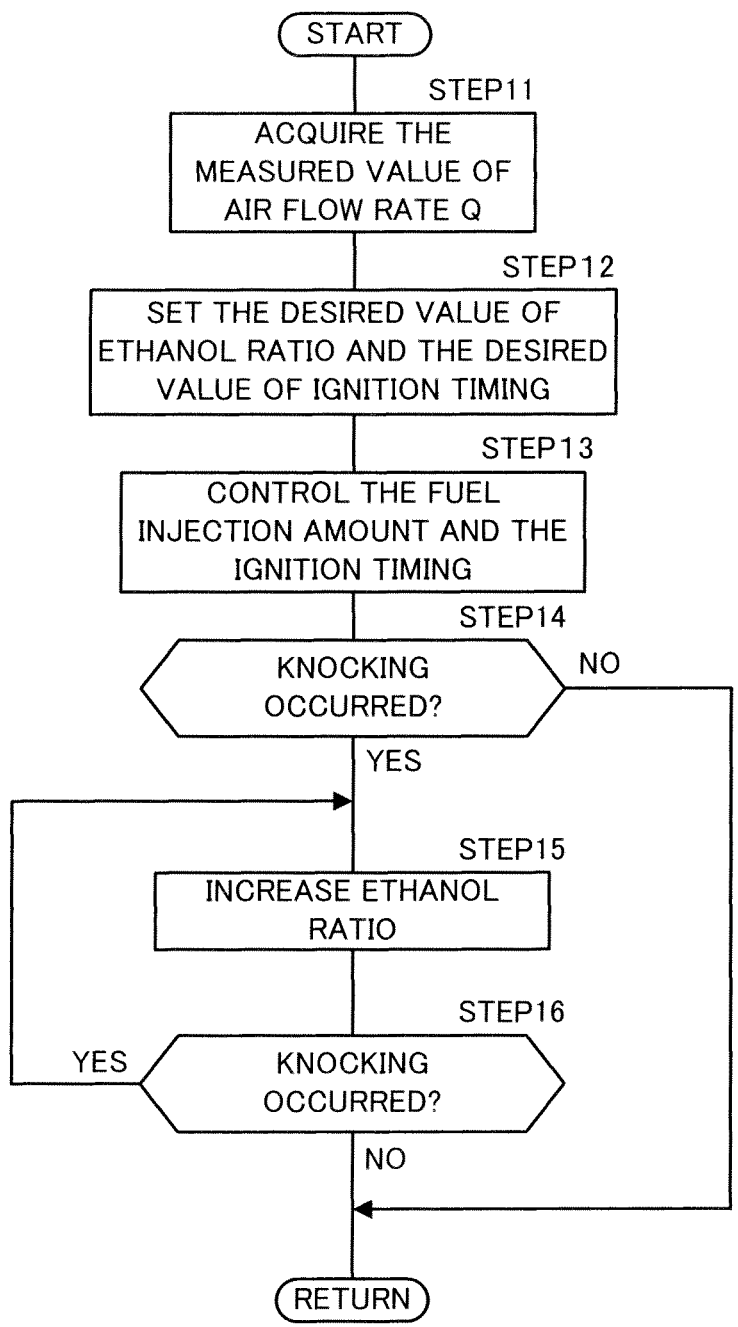
FIG. 10 is a flow chart illustrating a process performed by an electronic controller illustrated in FIG. 3 and FIG. 5.

The control process related to the fuels and the ignition timing is performed according to, for example, the flow chart illustrated in FIG. 10.

In the process, the electronic controller 50 firstly acquires the measured value of the air flow rate Q in STEP 11.

Subsequently, the process moves to STEP 12 where the electronic controller 50 sets the desired value of the supply ratio (hereinafter, referred to as the ethanol ratio where appropriate) of the high-octane fuel (ethanol) in the total fuel supplied to the combustion chamber 3 in each cylinder 2 and the desired value of the ignition timing.

Figure 11:
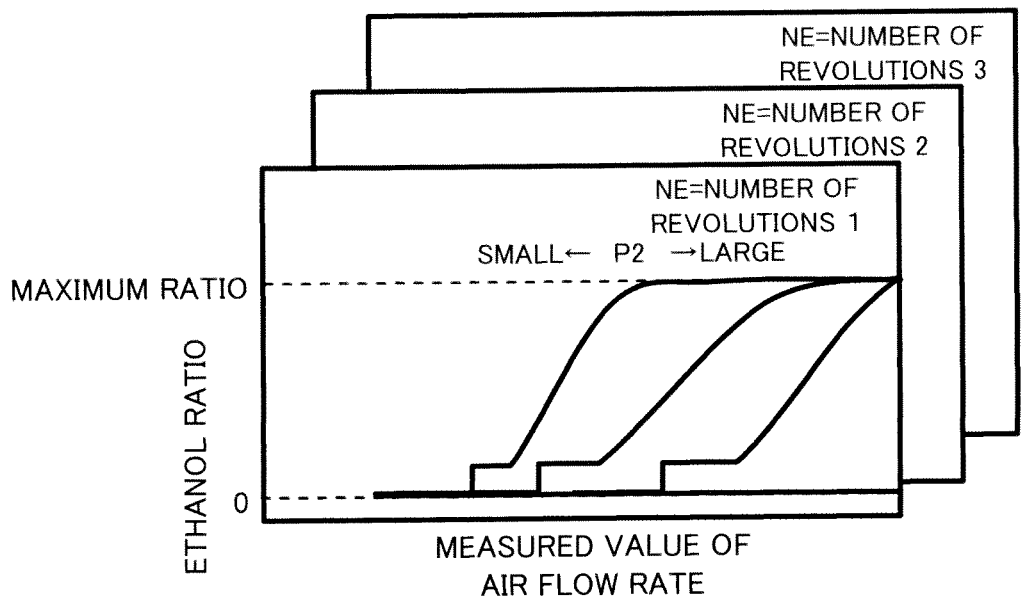
FIG. 11 is a diagram illustrating a map used in the process of STEP 12 in FIG. 10.

Specifically, the electronic controller 50 sets a desired value of the ethanol ratio on the basis of a predefined map illustrated in FIG. 11 (a map defining the relationship among the air flow rate Q, the pressure P2, the number of revolutions NE and the desired value of the ethanol ratio) from a measured value of the air flow rate Q, a measured value of the pressure P2 and a measured value of the number of revolutions NE of the internal combustion engine 1. The basic trend of the map in FIG. 11 is configured in such a way that the desired value of the ethanol ratio increases as the air flow rate Q increases, or the desired value of the ethanol ratio decreases as the pressure P2 increases, or the desired value of the ethanol ratio decreases as the number of revolutions NE increases.

The desired value of the ethanol ratio in the map of FIG. 11 is set to maintain the fuel injection amount from the fuel injection valve 24a not less than the lower injection limit. Therefore, in the map of FIG. 11, the desired value of the ethanol ratio is set in a region roughly constant at a value (>0) close to zero.

Figure 1A:
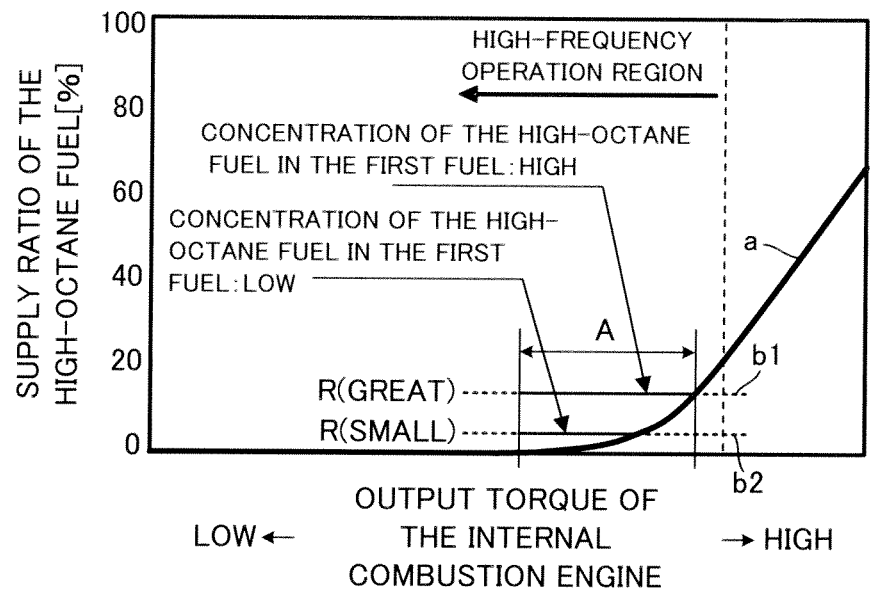
FIG. 1 is a graph for illustrating the present invention.
Figure 1B:
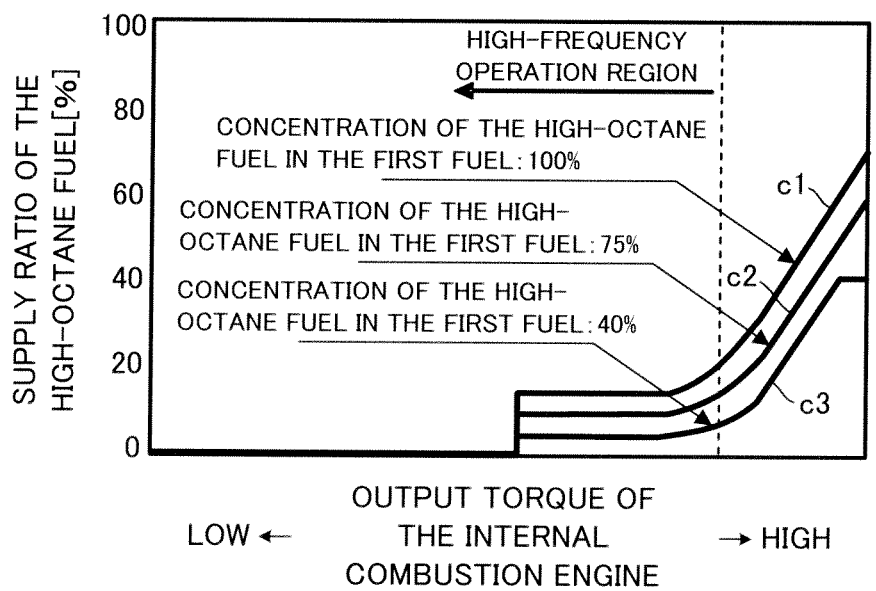

For supplemental description, by setting the desired value of the ethanol ratio according to the map in FIG. 11, the desired value of the ethanol ratio (the desired value of the supply ratio of the high-octane fuel) varies with respect to the output torque of the internal combustion engine 1 according to the characteristic illustrated by the graph in FIG. 1(*b*) (the characteristic of the graph when the concentration of the high-octane fuel in the first fuel is a constant value (for example, 40%)).

Figure 12:
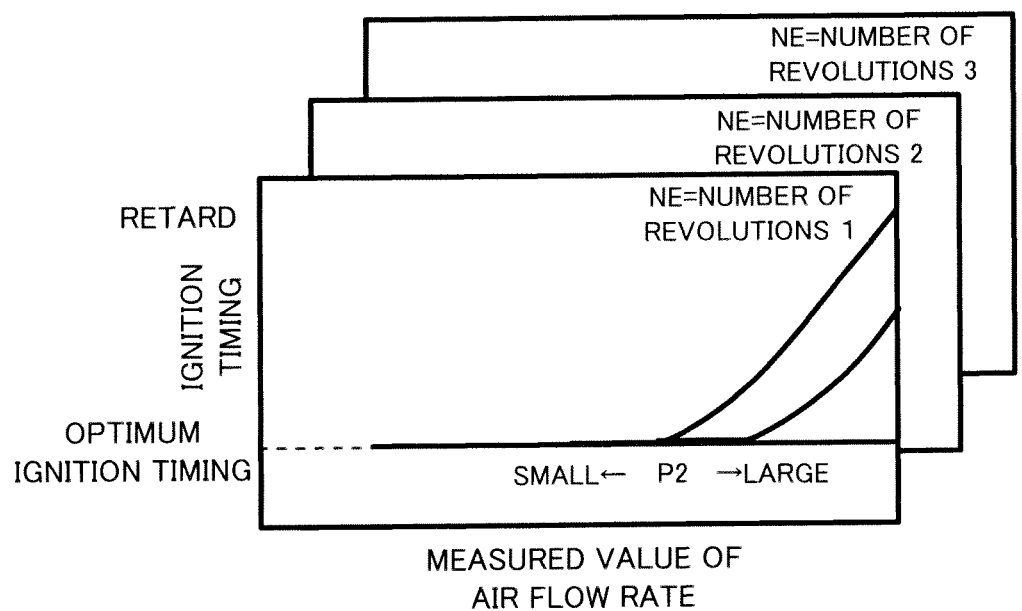
FIG. 12 is a diagram illustrating a map used in the process of STEP 12 in FIG. 10.

The electronic controller 50 sets a desired value of the ignition timing on the basis of a predefined map illustrated in FIG. 12 (a map defining the relationship among the air flow rate Q, the pressure P2, the number of revolutions NE and the desired value of the ignition timing) from a measured value of the air flow rate Q, a measured value of the pressure P2 and a measured value of the number of revolutions NE of the internal combustion engine 1. The basic trend of the map in FIG. 12 is configured in such a way that the desired value of the ignition timing is maintained at the optimum ignition timing (also called as MBT) when the internal combustion engine 1 is in operation other than a high load operation (middle load operation or low load operation). In the map shown in FIG. 12, a spark delay of the desired value of the ignition timing from the optimum ignition timing increases as the air flow rate Q is large, or the spark delay of the desired value of the ignition timing increases as the pressure P2 decreases, or the spark delay of the desired value of the ignition timing decreases as the number of revolutions NE is high.

Thereafter, the process moves to STEP 13 where the electronic controller 50 controls the actual fuel injection amount by the fuel injection valves 24a and 24b disposed for each cylinder 2 to satisfy the desired value of the ethanol ratio determined above, and controls the actual ignition timing of the ignition plug 30 disposed for each cylinder 2 to be the desired value.

In the control of the actual fuel injection amount by the fuel injection valves 24a and 24b, the sum (the total amount of fuels supplied to the combustion 3 in each cylinder 2) of the actual fuel injection amount by the fuel injection valves 24a and the actual fuel injection amount by the fuel injection valves 24b is determined on the basis of the measured value of the air flow rate Q of the intake passage 4. On the basis of the total amount of the supplied fuels, the desired value of the ethanol ratio and the concentration of the high-octane fuel (ethanol) in the first fuel, the fuel injection amount for each of the fuel injection valves 24a and 24b is determined; the valve-opening time for each of the fuel injection valves 24a and 24b is controlled on the basis of the determined fuel injection amount.

It is acceptable that the value of the concentration of the high-octane fuel (ethanol) in the first fuel to determine the fuel injection amount by each of the fuel injection valves 24a and 24b is the desired value in the fuel separation device 25; however, in the case where the concentration of the high-octane fuel (ethanol) in the first fuel tank 26 is detected by an appropriate sensor, it is also acceptable that the detected value of the concentration is used to determine the fuel injection amount by each of the fuel injection valves 24a and 24b.

Thereafter, the process moves to STEP 14 where the electronic controller 50 determines whether or not a knocking has occurred in the internal combustion engine 1 by a knock sensor. If the determination result is negative, the electronic controller 50 terminates the current process in the flow chart of FIG. 10 and stands idle till the next arithmetic processing cycle.

On the other hand, if the determination result in STEP 14 is affirmative, the electronic controller 50 performs the process in STEP 15. In the process of STEP 15, the electronic controller 50 adjusts the fuel injection amount by the fuel injection valves 24a and 24b disposed for each cylinder 2 by increasing the ethanol ratio from the current value by a predetermined amount.

In STEP 16, the electronic controller 50 performs the same determination process as that in STEP 14. The electronic controller 50 repeats the process in STEP 15 until the determination result in STEP 16 becomes negative.

Hereto, the control process illustrated by the flow chart in FIG. 10 has been described.

For supplemental description, the electronic controller 50 functions as the fuel supply controller in the present invention. The function of the fuel supply controller is achieved via the process in the flow chart of FIG. 10 (the process among STEP 11 to STEP 16 where the process related to the ignition timing excluded). In the present embodiment, the ethanol ratio is equivalent to the fuel supply ratio parameter of the present invention.

In the present embodiment, the ethanol ratio (the supply ratio of the high-octane fuel) itself is also used as the fuel supply ratio parameter of the present invention. However, the supply ratio of the high-octane fuel is roughly defined by the supply ratio of the first fuel in the total fuels supplied to the combustion chamber 3 in each cylinder according to the present embodiment. Therefore, it is acceptable to use the supply ratio of the first fuel, for example, as the fuel supply ratio parameter of the present invention.

In the present embodiment, the process illustrated by the flow chart of FIG. 6 and the process illustrated by the flow chart of FIG. 10 are performed by the electronic controller 50 as mentioned in the above. Thereby, the output torque by the internal combustion engine 1 is controlled to approach to the required torque. Consequently, the ethanol ratio (the supply ratio of the high-octane fuel) set as mentioned in the above is controlled to vary with respect to the output torque by the internal combustion engine 1 according to the characteristic illustrated by the graph of FIG. 1(*b*) (the characteristic of the graph when the concentration of the high-octane fuel in the first fuel is constant (for example, 40%)).

Hereinafter, the reasons for setting the upper limit value and the lower limit value for the concentration of the high-octane fuel (ethanol) in the first fuel at 75% and 30%, respectively, will be described.

In the present embodiment, firstly, the following experiment is carried out preliminarily so as to determine the upper limit value for the concentration of the high-octane fuel (ethanol) in the first fuel. Specifically, plural groups of the first fuel and the second fuel separated or generated from the mixed fuel (fuel E10) were prepared in advance with the concentration of the high-octane fuel (ethanol) in the first fuel being set at various values in a prescribed range (for example, from 40% to 100% in volume ratio). In either group, the concentration of the high-octane fuel in the second fuel is about 0%.

Plural internal combustion engines 1 of different specifications were prepared. Each kind of the internal combustion engines 1 was operated in a preliminarily defined operation mode by using each group of the first fuel and the second fuel, and the consumed amount of the high-octane fuel in the first fuel in the operation was measured. The operation mode is defined to have plural kinds of patterns, and the consumed amount of the high-octane fuel was measured for every pattern of the operation mode. In each pattern of the operation mode, the fuel injection amount by the fuel injection valve 24*a* of the first fuel is restricted to the lower injection amount limit, in other words, the operation mode is defined to include the operation state of the internal combustion engine 1 in the high-frequency region as illustrated in FIG. 1(*a*) and FIG. 1(*b*).

Figure 13:
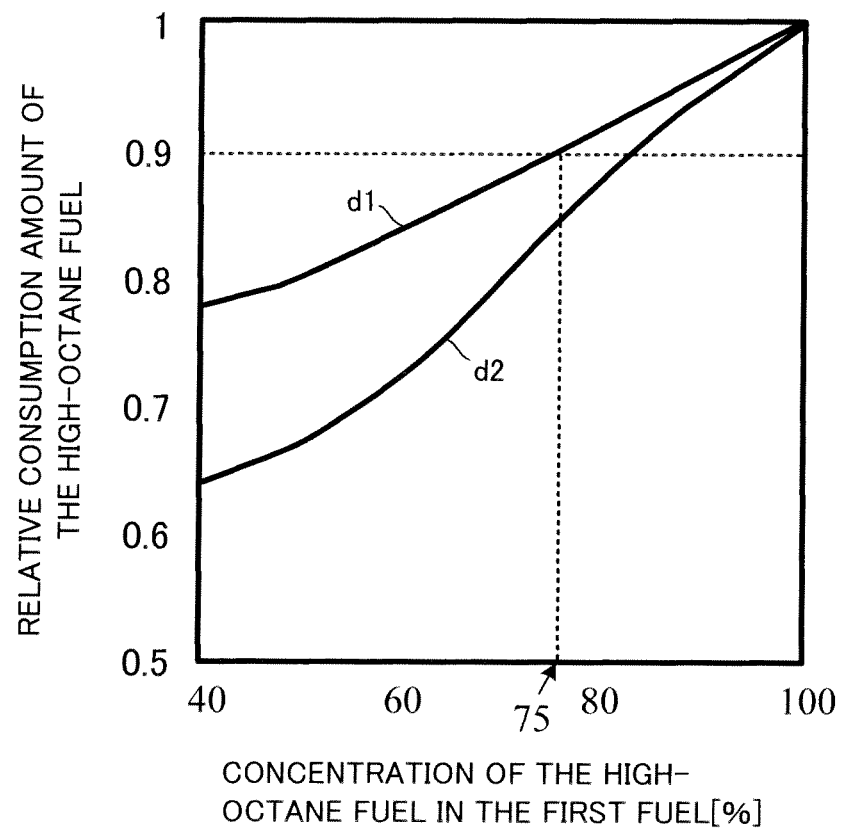
FIG. 13 is a diagram illustrating a method of defining an upper limit value of concentration of a high-octane fuel.

The data obtained from the measuring experiments is illustrated in FIG. 13. If the consumed amount of the high-octane fuel (ethanol) measured when the concentration of the high-octane fuel (ethanol) in the first fuel is 100% is used as a reference ("1"), then, FIG. 13 illustrates a relationship between a relative consumption amount to the reference and a concentration of the high-octane fuel in the first fuel. In FIG. 13, the region between the solid lines d1 and d2 denotes a distribution region of the relative consumption amount corresponding to the measured value of the consumed amount of the high-octane fuel.

In other words, with respect to each value of concentration of the high-octane fuel (ethanol) in the first fuel, the relative consumption amount corresponding to the measured value of the consumed amount of the high-octane fuel is constrained within the range between the solid lines d1 and d2 in FIG. 13. As viewed from FIG. 13, the consumed amount of the high-octane fuel tends to increase as the concentration of the high-octane fuel in the first fuel increases.

In the present embodiment, the upper limit value of the concentration of the high-octane fuel in the first fuel was set on the basis of the obtained data in FIG. 13. Specifically, in FIG. 13, the value of the concentration of the high-octane fuel where the consumed amount of the high-octane fuel is not greater than 90% of the consumed amount when the concentration of the high-octane fuel in the first fuel is 100% (the relative consumed amount is not greater than 0.9) was set as the upper limit value of the high-octane fuel. As illustrated in FIG. 13, the upper limit value is approximately 75%.

Figure 2:
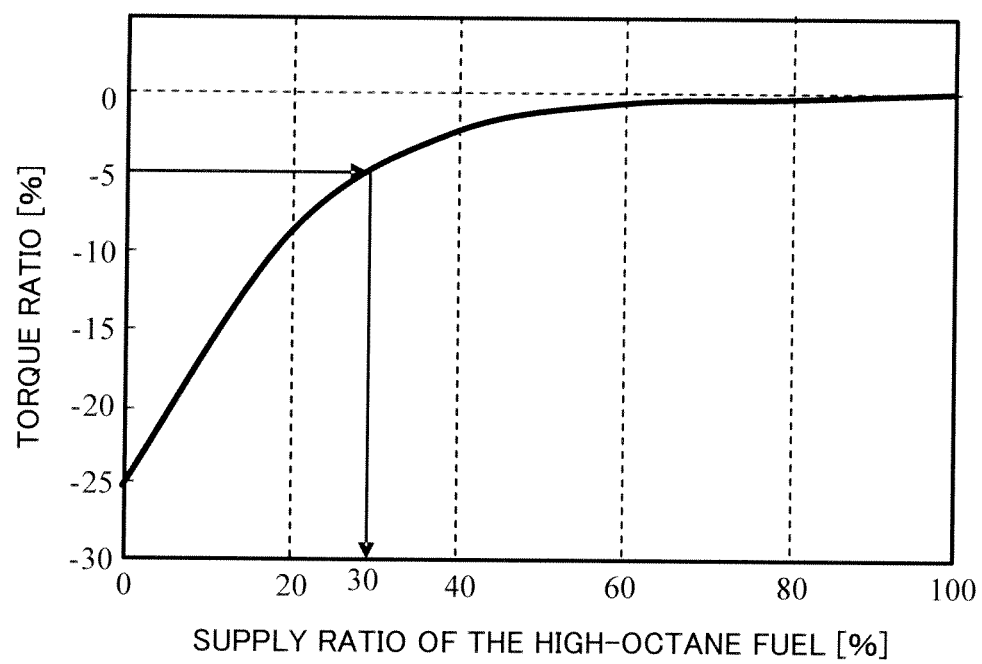
FIG. 2 is a graph for illustrating the present invention.

The lower limit value of the concentration of the high-octane fuel (ethanol) in the first fuel was set on the basis of the graph in FIG. 2. The graph in FIG. 2 was created on the basis of the experimental data obtained when the internal combustion engine 1 was operated with the supply ratio of the high-octane fuel in the total fuels supplied to the combustion chamber 3 in each cylinder 2 of the internal combustion engine 1 set at various values.

The value of the supply ratio of the high-octane fuel (ethanol ratio) where the torque is 95% (the torque ratio is −5%) of the maximum output torque (the torque ratio is 0%) of the internal combustion engine 1 when the supply ratio of the high-octane fuel (ethanol ratio) is 100% (in other words, the first fuel having the concentration of the high-octane fuel (ethanol) at 100% is supplied to the combustion chamber 3 in each cylinder 2 only from the fuel injection valve 24*a* in the fuel injection valves 24*a* and 24*b*) was set as the lower limit value for the supply ratio of the high-octane fuel. As illustrated in FIG. 2, the lower limit value is 30%.

In order to ensure the supply ratio of the high-octane fuel not less than the lower limit value (30%), it is necessary that the concentration of the high-octane fuel (ethanol) in the first fuel should be not less than the lower limit value (30%) of the supply ratio of the high-octane fuel; therefore, in the present embodiment, the lower limit value (30%) of the supply ratio of the high-octane fuel itself was set as the lower limit value of concentration of the high-octane fuel in the first fuel.

Hereto, the reasons for setting the upper limit value and the lower limit value for the concentration of the high-octane fuel in the first fuel to be 75% and 30%, respectively, have been described according to the present embodiment.

In the present embodiment described above, since the concentration of the high-octane fuel in the first fuel separated or generated by the fuel separation device 25 is restricted not greater than the above-mentioned upper limit value. Therefore, it is possible to reduce the consumed amount of the high-octane fuel when the internal combustion engine 1 is operated in the above-mentioned operation mode.

Moreover, since the concentration of the high-octane fuel in the first fuel is restricted not less than the above-mentioned lower limit value. Therefore, it is possible to approach the maximum available output torque from the internal combustion engine 1 sufficiently close to the maximum toque (maximum reference torque) produced when the supply ratio of the high-octane fuel is 100%.

Since the concentration of the high-octane fuel in the first fuel separated or generated by the fuel separation device 25 can be relatively low, it is possible to alleviate the required performance of the fuel separation device 25. Thereby, it is possible to make the fuel separation device 25 smaller in size, and it is possible to reduce the time for producing the first fuel having the desired concentration of the high-octane fuel as well.

Moreover, since the concentration of the high-octane fuel in the first fuel separated or generated by the fuel separation device 25 can be relatively low, it is possible to supply more amount of the first fuel injected from the first fuel injection valve 24*a* for the first fuel which is a fuel direct injection valve in the case where the supply ratio of the high-octane fuel supplied to the combustion chamber 3 in each cylinder 2 of the internal combustion engine 1 is constant than in the case where the concentration of the high-octane fuel in the first fuel is relatively high (namely, it is possible to increase the direct injection ratio).

Thereby, it is possible to improve the cooling effect of the first fuel injection valve 24a so as to prevent the first fuel injection valve 24a from becoming excessively high temperature.

In the embodiment described above, ethanol has been described as an example of the high-octane fuel and gasoline as an example of the low-octane fuel; however, it is acceptable that the high-octane fuel is an alcohol such as methanol or the like other than ethanol, or an aromatic hydrocarbon or the like. It is also acceptable that the high-octane fuel is composed of plural kinds of fuel components.

Further, in the embodiment described above, the fuel injection valve 24a for injecting the first fuel is configured as a direct type fuel injection valve; however, it is acceptable to configure it as a port type fuel injection valve similar to the fuel injection valve 24b for injecting the second fuel as well.

What is claimed is:

1. An operating system for an internal combustion engine, comprising:
   a fuel separation device configured to separate a mixed fuel of a high-octane fuel and a low-octane fuel having a lower octane number than the high-octane fuel to a first fuel having a higher concentration of the high-octane fuel than the mixed fuel and a second fuel having a lower concentration of the high-octane fuel than the mixed fuel;
   an internal combustion engine operating by combusting at least one of the first fuel and the second fuel in a combustion chamber;
   a first fuel injection valve and a second fuel injection valve configured to be supplied with the first fuel and the second fuel separated by the fuel separation device, respectively, and to inject the first fuel and the second fuel to the combustion chamber of the internal combustion engine for combustion separately at a fuel injection amount not less than a prescribed lower injection amount limit, respectively; and
   a fuel supply controller configured to variably set a fuel supply ratio parameter defining a desired value of a supply ratio of the high-octane fuel which is a ratio of a supplied amount of the high-octane fuel in the fuels supplied to the combustion chamber of the internal combustion engine to vary according to at least an output torque from the internal combustion engine and to control the fuel injection quantities from the first fuel injection valve and the second fuel injection valve respectively according to the set fuel supply ratio parameter;
   wherein the fuel separation device is configured to separate the first fuel from the mixed fuel to have a concentration of the high-octane fuel not more than a prescribed upper limit, and
   the prescribed upper limit value is defined in such a way that a first high-octane fuel consumption amount is less than a second high-octane fuel consumption amount by a prescribed amount or more,
   the first high-octane fuel consumption amount is a consumed amount of the high-octane fuel which is detected under such a condition that the internal combustion engine is operated at a preliminarily prescribed operation mode including at least an operation state of the internal combustion engine in which the fuel injection amount from the first fuel injection valve is equal to the lower injection amount limit by using the first fuel and the second fuel separated by the fuel separation device, and
   the second high-octane fuel consumption amount is a consumed amount of the high-octane fuel which is detected under such a condition that the internal combustion engine is operated at the prescribed operation mode by using the first fuel having the concentration of the high-octane fuel at 100% and the second fuel having the concentration of the high-octane fuel at 0%.

2. The operating system for the internal combustion engine according to claim 1, wherein
   the first fuel injection valve configured to inject the first fuel is a direct type fuel injection valve which injects the first fuel directly into the combustion chamber of the internal combustion engine, and
   the second fuel injection valve configured to inject the second fuel is a port type fuel injection valve which injects the second fuel into the combustion chamber of the internal combustion engine via an intake port disposed in the combustion chamber.

3. The operating system for the internal combustion engine according to claim 1, wherein
   the prescribed upper limit value is defined in such a way that the first high-octane fuel consumption amount is not more than 90% of the second high-octane fuel consumption amount.

4. The operating system for the internal combustion engine according to claim 3, wherein
   the prescribed upper limit value is 75%.

5. The operating system for the internal combustion engine according to claim 1, wherein
   the fuel separation device is configured to separate the first fuel from the mixed fuel to have a concentration of the high-octane fuel not more than the prescribed upper limit value and not less than a prescribed lower limit value, and
   the prescribed lower limit value is defined in such a way that a maximum value of the output torque of the internal combustion engine obtained when the internal combustion engine is operated by using only the first fuel having the concentration of the high-octane fuel matched with the prescribed lower limit value as the fuel to be supplied to the combustion chamber of the internal combustion engine is not less than a preliminarily prescribed torque value.

6. The operating system for the internal combustion engine according to claim 5, wherein
   the prescribed torque value is a torque value having a magnitude of 95% of the maximum output torque of the internal combustion engine obtained when the internal combustion engine is operated by using only the first fuel having the concentration of the high-octane fuel at 100%.

* * * * *